Sept. 29, 1931.  J. L. SNYDER  1,825,020
CENTRIFUGAL HONEY EXTRACTOR
Filed Nov. 27, 1929  2 Sheets-Sheet 1
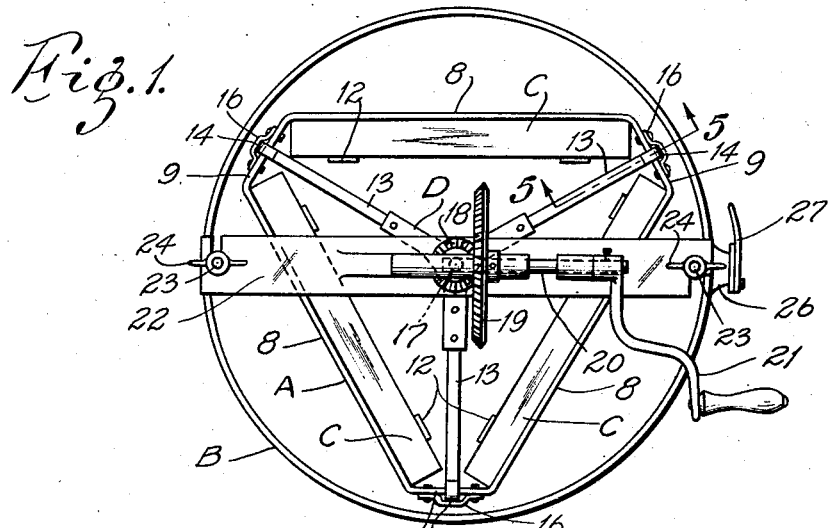
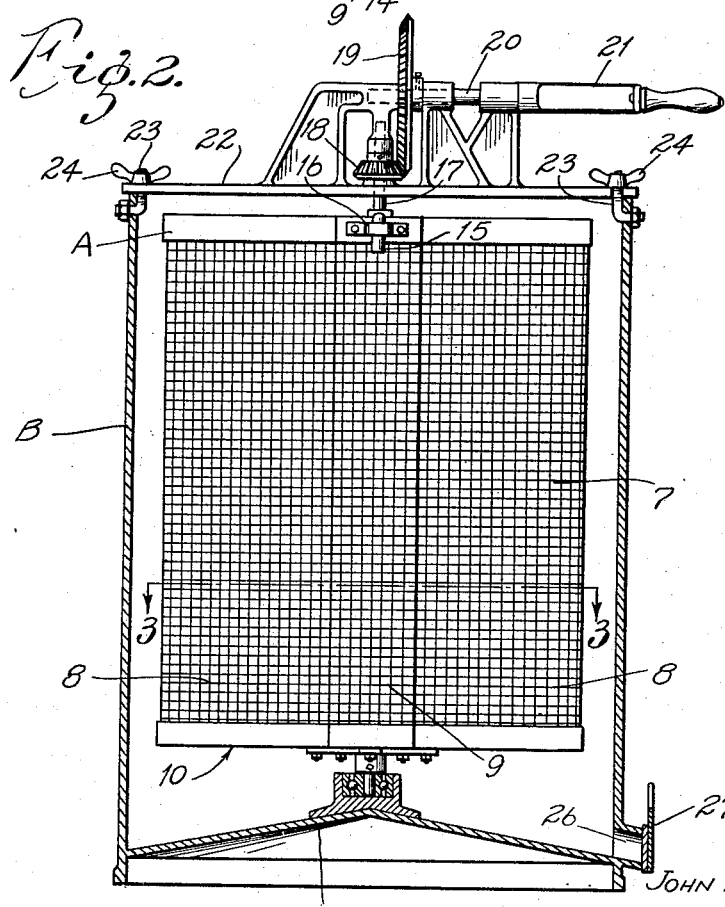
INVENTOR:
JOHN L. SNYDER.
By James L. Hopkins,
ATTORNEY.

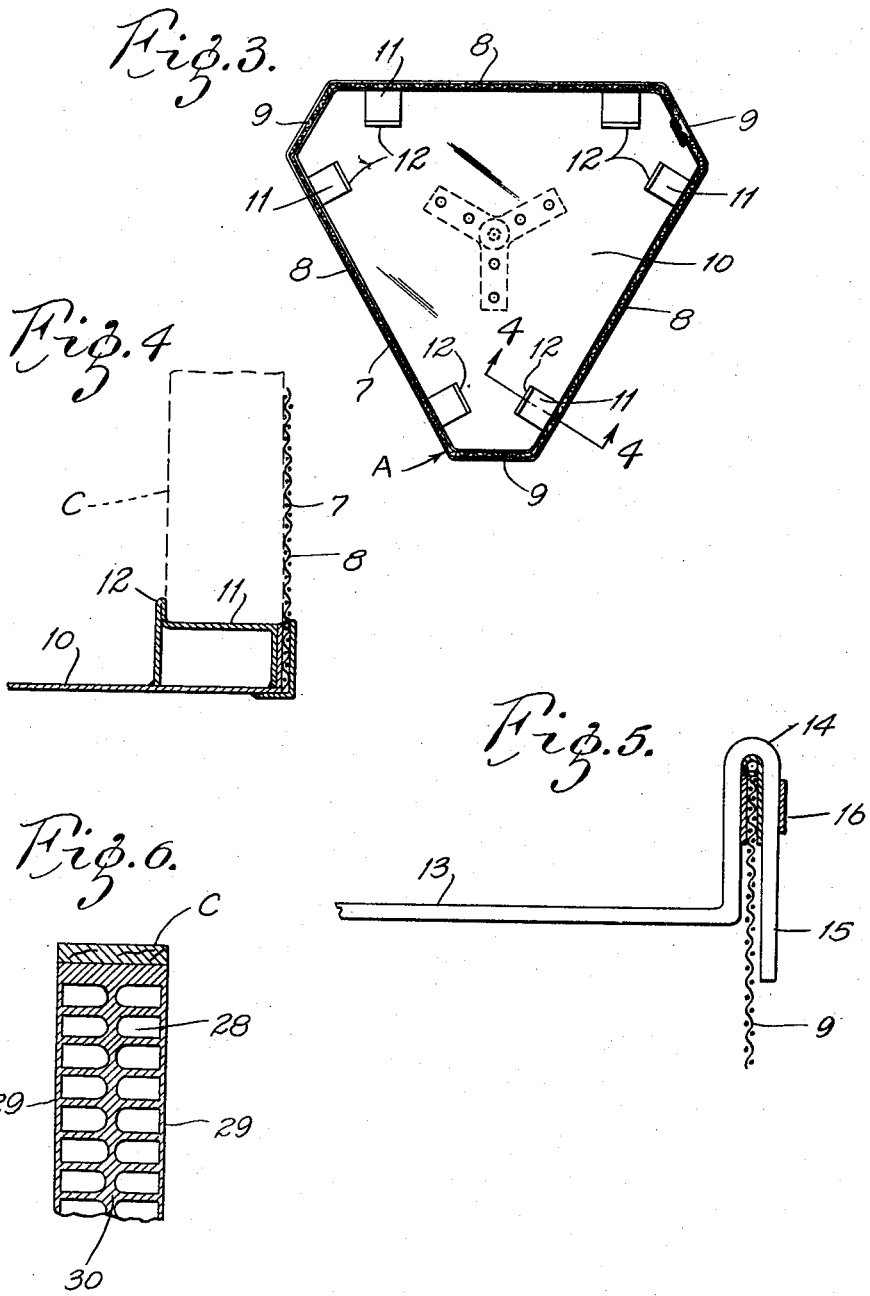

Patented Sept. 29, 1931

1,825,020

UNITED STATES PATENT OFFICE

JOHN L. SNYDER, OF WAPAKONETA, OHIO, ASSIGNOR TO STANDARD CHURN COMPANY, OF WAPAKONETA, OHIO, A CORPORATION OF OHIO

CENTRIFUGAL HONEY EXTRACTOR

Application filed November 27, 1929. Serial No. 410,058.

My invention relates to improvements in centrifugal honey-extractors and has for its object to provide an extractor which will dispense with the baskets commonly employed in machines of this type for receiving and holding the honey-comb during the process of extracting the honey.

Such baskets have been commonly employed in the prior machines in this art because of the delicate or fragile character of the honey-comb and particularly the delicate nature of the vertical partition wall separating the honey cells formed at each side of said wall. Because of the delicate nature of that partition wall it has heretofore been customary to subject one side of the comb to but partial centrifugal extraction, because of the danger of the weighted cells on the opposite side of the comb breaking down the partition and thus rendering the further extraction of the honey difficult. Therefore, the practice has been to extract only part of the honey from one side of the comb and then to reverse the comb completely extracting the honey from the opposite side. This reversal being done to avoid the breaking down of the partition and the remainder of the comb. By the machine of my instant invention, I have endeavored to overcome this premature reversal of the comb, and to so mount the comb as to permit the complete extraction from the side of the comb first operated upon.

Another object of my invention is to provide a machine which will both extract the honey from the comb and immediately thereafter be capable of use for extracting the honey from the "cappings".

In modern apiary practice there is employed in the hives a standard comb-frame measuring approximately 18″ x 9¼″. These frames have ordinarily been placed in baskets of mesh material for the purpose of extraction. My invention contemplates doing away with the employment of such baskets, and performing the extraction directly from the comb as contained in the comb-frame.

After the bees have filled the cells of the comb with honey they cover the outer faces of the filled cells with a thin layer of wax called "capping". The first step in extracting the honey from the comb is to slice off this entire surface "capping" from both faces of the honey-comb. In this operation, however carefully conducted, the operator usually cuts off not only the "capping" but from one-eighth to one-quarter inch of the cells and the result is a quantity of "cappings", containing an appreciable amount of honey, which is pulled out of the cells by the "capping" operation and which is admixed with the comb material, forming a conglomerate mass of wax mixed with honey, in which mass there is sufficient honey to warrant its recovery by extraction. The problem of extracting the honey from said mass has heretofore been accomplished with some degree of success by means of a separate basket to be charged with "cappings" and hooked, or otherwise detachably fastened to the baskets or elsewhere on the revolvable parts of the centrifugal extractor. In the machine of my invention I have dispensed with any separate holder for such "cappings", and accomplished the result by placing the "cappings" in my rotatable comb-receptacle after the honey has been extracted from the comb. This I accomplish by so constructing my mechanism for rotating the comb-receptacle as to render it readily detachable from the receptacle, leaving the receptacle with an open mouth for the ready reception of the "cappings".

Other features of my invention will appear from appended descriptive portion of this specification.

Drawings

In the drawings—

Fig. 1 is a top plan view of a machine embodying my invention.

Fig. 2 is a side elevation of the operating mechanism and comb-receptacle, the tank or housing being shown in vertical mid-section.

Fig. 3 is a transverse vertical view of the comb-receptacle taken on the line 3—3 of Fig. 2.

Fig. 4 is a sectional fragmental view illustrating the mounting of the standard comb frame within the rotatable receptacle.

Fig. 5 is a fragmental view illustrating the detachable engagement of the actuating mechanism with the comb-receptacle, the fragment being indicated by 5—5 in Fig. 1.

Fig. 6 is a transverse sectional view of a fragment of honey-comb in place within the comb-frame.

Description

I have illustrated in the drawings a 3-frame extractor, which is my present commercial model, designed to accommodate three standard honey-comb frames at each operation. I have adopted that polygonal form for my receptacle A to economize the space occupied by the tank or housing B. The vertical wall 7 of the receptacle A is made of any suitable reticulated material of sufficiently fine mesh to prevent the escape of any fragments of comb in the cappings, while freely permitting the passage of the honey. In the drawings the three vertical reticulated faces 8 of the receptacle A are spaced apart at 9 so as to provide room with the receptacle A for the meeting inner and vertical edges of the standard honey-comb frames C (see Fig. 1). At the bottom 10 of the receptacle A, I have provided brackets 11, each having an inner up-turned lip 12 (see Fig. 4).

These brackets being arranged as indicated in Fig. 3 so that when the lower edges of the standard frames C are dropped into place, the uncapped outer surface of the comb held in each of the frames C rests against and is supported by the material of the flat vertical walls 8.

The spider D is provided with the 3 arms 13—13—13; and the outer terminal of each of said arms 13 is contoured to form a hook 14 having the depending finger 15 (see Fig. 5). At the top of each of the short vertical walls 9, the receptacle A is provided with a socket 16 for the reception of the finger 15, as shown in Fig. 5, thus readily permitting the disengagement of the receptacle A from the revolving arms 13. The spider D is rotated by means of a central shaft 17, beveled gears 18, 19, shaft 20 and crank 21, said last named mechanism being mounted upon the supporting bar 22, which is detachably mounted atop the tank B by means of the threaded rods 23 and winged nuts 24.

The tank B is provided with the conical bottom 25, outlet spout 26 and gate-valve 27.

Mode of operation

The frame C with its contained honey-charged comb 28 being removed from the hive, the outer cappings 29 are cut from both sides of the comb, as heretofore described, and the cut cappings of wax admixed with honey are laid aside in a suitable receptacle; whereupon the frame C is slid into position within the receptacle A, its bottom edges being held by the brackets 11 and up-turned lips 12, as shown in Fig. 4. Three frames being thus placed in position, the outer cut faces supported by the reticulated walls 8, the receptacle A is rotated to extract the honey from the outer faces of the comb. During the operation the wall 8 supports the faces of the comb so effectively that the partition 30 in the comb is not broken down, even when the honey from the outer faces of the comb has been completely extracted.

Such complete extraction from the outer faces of the comb being completed, the frame C is reversed upon the brackets 11—11 and the rotation of the receptacle A continued to the point of complete extraction of the honey from the comb.

Thereupon all of the frames C are removed from the receptacle A, which is readily done by disengaging receptacle A from the driving mechanism and the mass of cappings is then dumped into the bottom of the receptacle A, the driving mechanism again placed in operative position and the receptacle A rotated to extract the honey from the cappings.

While my present commercial machine is of the construction illustrated in the drawings, it is obvious that the receptacle A may be of any desired dimensions, provided that its faces 8 are dimensioned to hold one standard honey-comb frame, or a plurality of such frames; it being merely requisite that the reticulated walls 8 should hold such standard frames with their outer faces in contact with the inner faces of the wall 8 during the operation of extraction. Other variations from the structure above described may be effected without departure from my actual invention as designed by the appended claim.

I claim—

In a centrifugal honey extractor, of the type having an outer container, and an inner wire mesh rotating container to receive the honey combs, said inner container formed with a hexagonal frame having a covering of wire mesh; three of the sides being longer than the remaining three sides the said long sides being disposed with reference to each other in approximately the shape of an equilateral triangle, to receive against each side thereof a comb frame; the smaller sides being unobstructed adjacent the angles of the hexagon to form an edge abutment to prevent slipping of the comb, means for rotating the container, and said container being detachably carried in the outer container.

In testimony whereof I have hereunto affixed my signature.

JOHN L. SNYDER.